US012733763B2

(12) United States Patent
Nguy

(10) Patent No.: US 12,733,763 B2
(45) Date of Patent: Sep. 15, 2026

(54) COLLAPSIBLE CONE TREE WITH MULTIPLE LIGHT STRINGS

(71) Applicant: Global Industries Holdings, Ltd., Bannockburn, IL (US)

(72) Inventor: Chunwa Nguy, Cornelius, NC (US)

(73) Assignee: Global Industries Holdings, Ltd., Bannockburn, IL (US)

( * ) Notice: Subject to any disclaimer, the term of this patent is extended or adjusted under 35 U.S.C. 154(b) by 41 days.

(21) Appl. No.: 19/013,477

(22) Filed: Jan. 8, 2025

(65) Prior Publication Data

US 2025/0143499 A1 May 8, 2025

Related U.S. Application Data

(63) Continuation-in-part of application No. 18/943,410, filed on Nov. 11, 2024, which is a continuation-in-part of application No. 18/769,563, filed on Jul. 11, 2024, which is a continuation of application No. 18/270,164, filed as application No. PCT/US2022/051936 on Dec. 6, 2022, now Pat. No. 12,042,071.

(60) Provisional application No. 63/286,831, filed on Dec. 7, 2021.

(51) Int. Cl.
*A47G 33/06* (2006.01)
*F21S 4/10* (2016.01)

(52) U.S. Cl.
CPC ................ *A47G 33/06* (2013.01); *F21S 4/10* (2016.01)

(58) Field of Classification Search
CPC ...................................................... A47G 33/06
See application file for complete search history.

(56) References Cited

U.S. PATENT DOCUMENTS

| | | | | |
|---|---|---|---|---|
| 3,861,629 | A | 1/1975 | Merrill | |
| 4,736,282 | A | 4/1988 | Ahroni | |
| 5,057,976 | A * | 10/1991 | DuMong | F21S 4/10 362/239 |
| 5,673,893 | A | 10/1997 | Klein | |
| 12,042,071 | B2 | 7/2024 | Nguy | |
| 2008/0283717 | A1 | 11/2008 | Kim et al. | |
| 2014/0272202 | A1 | 9/2014 | Tsai | |

FOREIGN PATENT DOCUMENTS

| | | | |
|---|---|---|---|
| CN | 103375783 | A | 10/2013 |
| CN | 208011221 | U | 10/2018 |
| CN | 210018001 | U | 2/2020 |

(Continued)

OTHER PUBLICATIONS

ISR and Written Opinion issued by ISA/EPO in connection with PCT/2025/054739 dated Feb. 18, 2026, 17 pages.

*Primary Examiner* — Humera N. Sheikh
*Assistant Examiner* — Julia L Rummel
(74) *Attorney, Agent, or Firm* — Levenfeld Pearlstein, LLC

(57) ABSTRACT

A collapsible cone tree has a mast having a top and a base and a plurality of legs mounted to the base. The legs are foldable upwardly toward the mast to a storage position and pivotable to unfolded state. The legs cab lock in the unfolded state. Each leg has a free end. A plurality of first flexible stringers extend between the legs' free ends and the top of the mast and a plurality of additional flexible stringers extend from between respective ones of adjacent legs to the top of the mast.

5 Claims, 11 Drawing Sheets

(56) References Cited

FOREIGN PATENT DOCUMENTS

| | | | |
|---|---|---|---|
| CN | 111102541 | A | 5/2020 |
| CN | 212346816 | U | 1/2021 |
| CN | 218993274 | U | 5/2023 |
| WO | 2023107432 | A1 | 6/2023 |

* cited by examiner

COLLAPSIBLE CONE TREE WITH MULTIPLE LIGHT STRINGS

BACKGROUND

The following description generally relates to a cone tree, so as to resembling a Christmas tree, and more particularly, to an artificial collapsible cone tree.

FIGS. 1A and 1B illustrate typical artificial or string-light trees 1A and 1B. These trees require considerable amount of space for storage. The bases or stands 2A and 2B for such trees 1A and 1B are large circular members typically made from steel or aluminum and can be as large as 36 or 48 inches or more in diameter. This can be disadvantageous, especially in smaller home, apartments and the like that have limited storage space.

Although some stands 2A and 2B can be broken down into parts, the parts can be as large as the erected diameter, that is 36 inches, 48 inches or more. Storage of these large and cumbersome members during the eleven months that the tree 1A and 1B is in storage may be difficult.

Accordingly, there is a need for an artificial tree having an incorporated stand that is collapsible for easy storage, which stand has a large diameter base area for stability. More desirably, such an artificial tree has multiple light strings.

SUMMARY

In an aspect, a collapsible cone tree includes a mast, a base plate mounted to an end of the mast, a plurality of legs and a plurality of struts, and a support member slidably positioned on the mast.

Each leg has a first end pivotally mounted to the base plate and an opposite free end, and each strut has a first end pivotally mounted to a respective one of the plurality of legs intermediate the first end and the free end. Each strut has a second end, each pivotally mounted to the support member.

The support member is moved away from the base plate to collapse the legs toward the mast to a closed state, and is moved toward the base plate to open the legs away from the mast to an open state.

In an embodiment, the cone tree further includes a locking member to lock the cone tree in the open state. The locking member can include a biased button mounted in the mast and a cooperating opening in the sleeve such that when in the open state, the button extends into the opening.

In embodiments, the support member includes a sleeve and a strut plate. The sleeve is slidably positioned on the mast and the strut plate is fixedly mounted to the sleeve.

In an embodiment the legs are pivotally mounted to the base plate by a ring-shaped pivot pin, and in en embodiment 1, the struts are pivotally mounted to the support member by a ring-shaped pivot pin. In the open state, the free ends of the legs define a plane, and the mast is perpendicular to the plane.

In embodiments, the cone tree further includes a plurality of flexible stringers extending between the legs' free ends and a top of the mast. In embodiments, the flexible stringers are LED light strings. The LED light strings can be attached to the legs' free ends by biasing elements, such as coil springs. The flexible stringers can be mounted to the top of the mast at a receiver.

In embodiments the height of the mast is variable. The mast can be formed of multiple sections. The multiple sections can be telescopic.

In another aspect a collapsible cone tree includes a telescopic mast having a top, a base plate mounted to an opposite end of the mast, a plurality of legs, each having a first end pivotally mounted to the base plate and an opposite free end, a plurality of struts, each having a first end pivotally mounted to a respective one of the plurality of legs intermediate the first end and the free end, and having a second end. The cone tree further includes a sleeve slidably positioned on the mast, and a strut plate fixedly mounted to the sleeve for sliding movement with sleeve. The second end of each strut is pivotally mounted to the strut plate.

A plurality of flexible stringers extends between the legs' free ends and the mast top. The sleeve and strut plate are moved away from the base plate to collapse the legs toward the mast to a closed state, and the sleeve and strut plate are moved toward the base plate to open the legs away from the mast to an open state. The mast is deployed to extend the stringers so as to form the artificial cone tree.

In embodiments, the cone tree further includes a locking member having a biased button mounted in the mast and a cooperating opening in the sleeve, such that in the open state, the button extends into the opening to lock the cone tree in the open state.

In embodiments, the legs are pivotally mounted to the base plate by a ring-shaped pivot pin and/or the struts are pivotally mounted to the strut plate by a ring-shaped pivot pin.

In the open state, the free ends of the legs define a plane, and the mast is perpendicular to the plane. In embodiments, the free ends of the legs include eyelets and the stringers are mounted to the eyelets by biasing elements.

In another aspect, a collapsible cone tree has a mast having a top and a base and a plurality of legs mounted to the base. The legs are foldable upwardly toward the mast to a storage position and pivotable to unfolded state. The legs can lock in the unfolded state. The legs each having a free end.

A plurality of flexible stringers extend between the legs' free ends and the top of the mast. The plurality of stringers include at least one stringer between the free end of each leg and further include at least a second stringer extending from at least one leg at a location spaced from the leg's free end to the top of the mast.

In embodiments, multiple second stringers extend from respective ones of the legs at a location spaced from the legs' free ends to the top of the mast. In embodiments, each of the legs has a "second" stringer that extends from the leg at a location spaced from that leg's free end to the top of the mast. The lights strings can be LED light strings. The LED light strings can be attached to the legs' free ends by biasing elements. The legs can include eyelets and wherein the stringers are mounted to the eyelets by biasing elements.

In embodiments, the flexible stringers are mounted to the top of the mast at a receiver. The receiver can have a donut shape and can be configured to fit over the top of the mast. In embodiments, in the unfolded state, the free ends of the legs define a plane, and wherein the mast is perpendicular to the plane.

In embodiments, a collapsible cone tree has a mast having a top and a base, and a plurality of legs mounted to the base. The legs are foldable upwardly toward the mast to a storage position and are pivotable to unfolded state. The legs can lock in the unfolded state. The legs each have a free end.

A plurality of first flexible stringers extend between the legs' free ends and the top of the mast and a plurality of additional flexible stringers extend from between respective ones of adjacent legs to the top of the mast.

The cone tree can include a mount extending from adjacent ones of the legs. The mount includes a joining member, and the additional flexible stringers extend from respective ones of the joining members to the top of the mast. The first flexible stringers and the additional flexible stringers can be, for example, LED light strings. The first flexible stringers and the mount can be attached to the legs by biasing elements.

In embodiments, the mount includes a first flexible connecting member extending from one of the legs and a second flexible connecting member extending from an adjacent one of the legs. The first and second flexible connecting members are joined to the joining member. The first and second flexible connecting members can be mounted to their respective legs spaced from the legs' free ends.

In another aspect, a collapsible cone tree includes a mast having a top and a base and a plurality of legs mounted to the base. The legs are foldable upwardly toward the mast to a storage position and are pivotable to unfolded state. The legs lock in the unfolded state. The legs each have a free end.

A plurality of flexible stringers extend from the legs to the top of the mast. Some of the plurality of flexible stringers extend from free ends of the legs to the top of the mast, and others of the plurality of flexible stringers extend from other than the free ends of the legs to the top of the mast. Others of the plurality of flexible stringers extend from mounts extending between adjacent legs to the top of the mast. In embodiments, flexible stringers are LED light strings.

The mounts can be mounted to adjacent legs spaced from free ends of the legs. The flexible stringers and the mounts can be mounted to the legs by biasing elements such as springs.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1A:
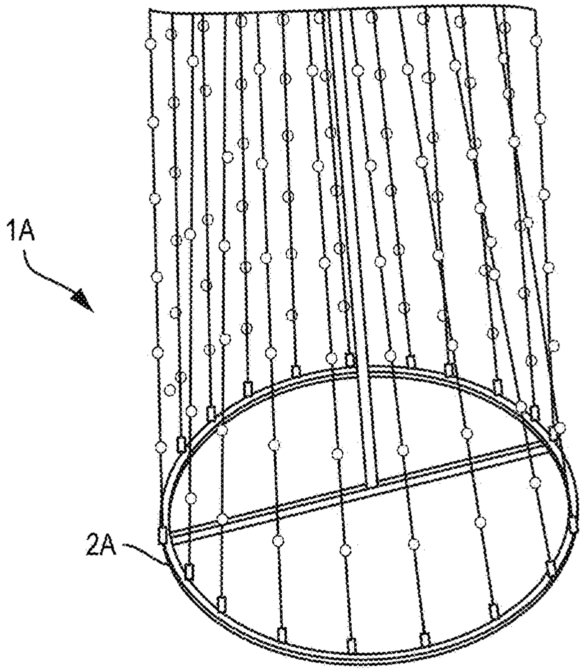
FIG. 1A PRIOR ART
FIGS. 1A and 1B illustrate known string-light trees and show the tree stands or bases.
Figure 1B:
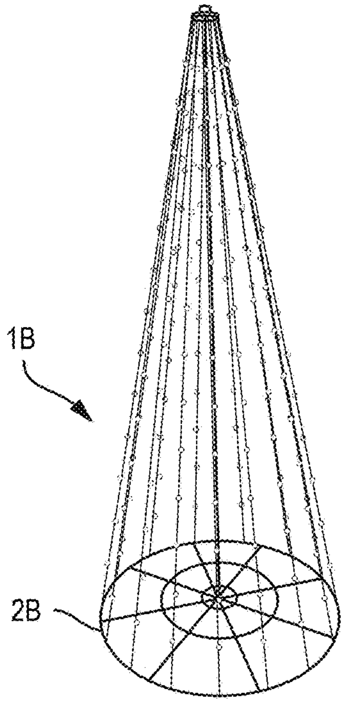
FIG. 1B PRIOR ART

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 2:
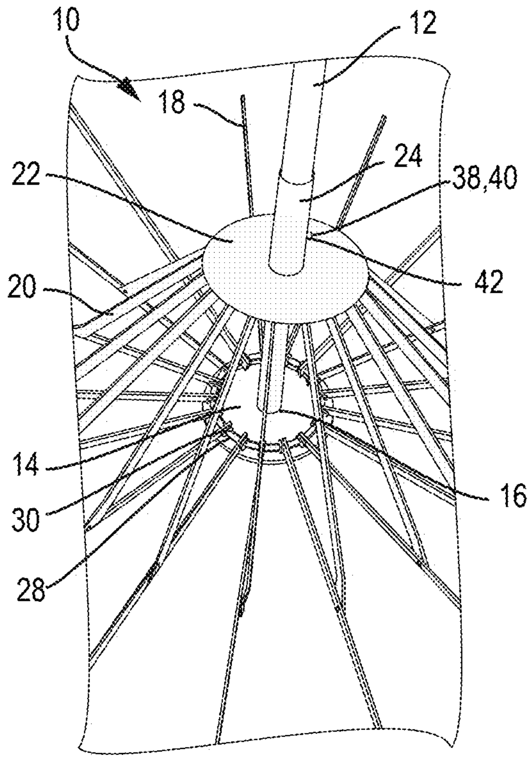
FIG. 2 is a partial view of an embodiment of a collapsible tree stand showing the upper and lower base plates, legs, and leg struts.
Figure 3:
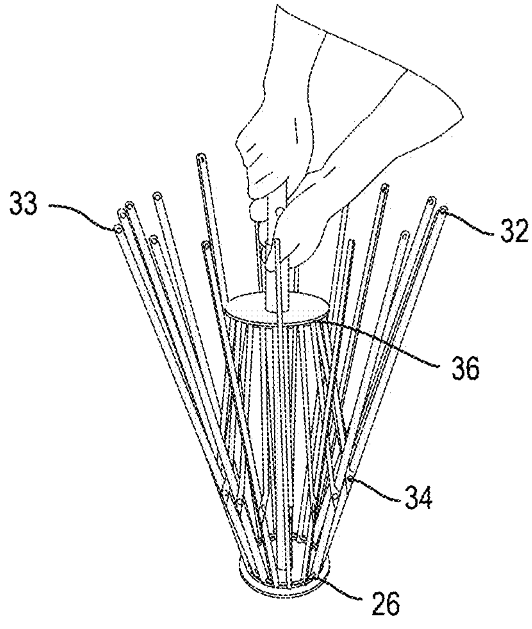
FIG. 3 illustrates the stand in a partially collapsed state, in the beginning stages of being opened.
Figure 4:
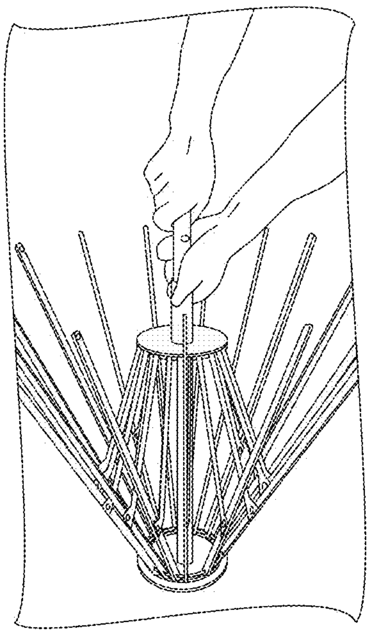
FIG. 4 illustrates the stand in a further state of being opened.
Figure 5:
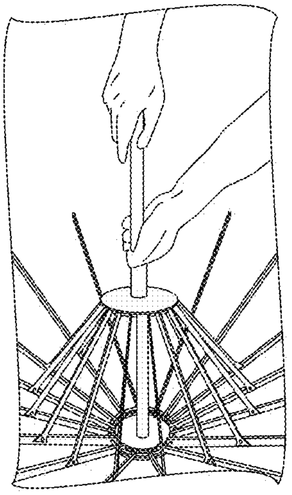
FIG. 5 illustrates the stand in still a further state of being opened.

FIG. 2 illustrates an embodiment of a stand 10 for a collapsible cone tree. The tree 11 is illustrated schematically in FIG. 7. The stand 10 includes a main pole or mast 12, a base plate 14 mounted to an end 16 of the mast 12, a plurality of legs 18 pivotally mounted to the base plate 14, a plurality of struts 20, each associated with and pivotally mounted to a respective one of the legs 18, a strut plate 22 to which the struts 20 are pivotally mounted, and a sleeve 24 slidably positioned on the mast 12 and mounted to strut plate 22.

Figure 6:
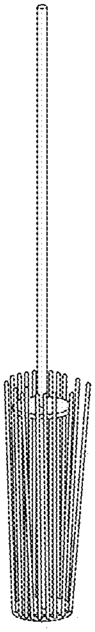
FIG. 6 illustrates the stand with the base in a fully collapsed state and the mast partially extended.
Figure 7:
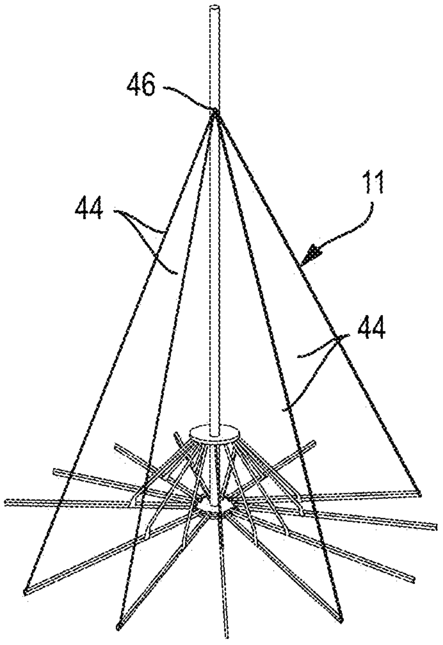
FIG. 7 illustrates the stand with the base fully deployed and the mast partially extended, and further showing the stingers extending between a number of the legs' free ends and the top of the mast.
Figure 8:
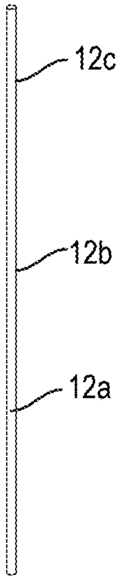
FIG. 8 shows the mast fully extended.

The mast 12 is the main support that forms the tree 11. Referring briefly to FIGS. 6-8, the mast 12 is formed in sections, for example, sections 12*a*, 12*b*, 12*c*, that telescope to a predetermined height. In a current embodiment the overall height of the stand 10 (the mast 12) is about 8 feet.

The base plate 14 is fixedly mounted to an end 16 of the mast 12. In a current embodiment, the base plate 14 is round and the mast 12 is mounted to the center of the base plate 14. The legs 18 are pivotally mounted at one end 26 to the base plate 14 inwardly of an outer periphery of the plate 14. In the illustrated embodiment, a ring-shape pivot pin 28 is mounted to the base plate 14 by a series of eye mounts 30 and the legs 18 are pivotally mounted to the pivot pin 28. An opposite end of each leg defines a free end 32. The free ends 32 each include an opening or eyelet 33.

One end 34 of each strut 20 is pivotally mounted to a respective leg 18 intermediate the base end pivot 26 and the free end 32. The other end 36 of each strut 20 is pivotally mounted to the strut plate 22. In a current embodiment, although not visible in the figures, a second ring-shape pivot pin is mounted to the struct plate by a series of eye mounts and the struts are pivotally mounted to the second pivot pin in a manner similar to the leg (first) ring-shaped pivot pin and the second pivot pin is likewise mounted to the strut plate by a series of eye mounts.

The strut plate 22 is fixedly mounted to the sleeve 24. In a current embodiment, the sleeve 24 fits over and slides along the mast 12. The strut plate 22 is mounted to the sleeve 24 between ends of the sleeve. The mast 12 can include locking members 38 that cooperate with the sleeve 24 to lock the stand 10 in one or both of the open and closed positions. In a current embodiment the locking members 38 include biased buttons 40 in the mast 12 that insert into openings 40 in the sleeve 24. FIG. 2 shows the button 40 in place in the opening 42 when the stand 10 is in the fully open state. Alternately, the locking members can include a threaded member (not shown), such as a threaded shank mounted to a handle and threads in the opening 42 which is threaded to accept the threaded member.

Figure 9:
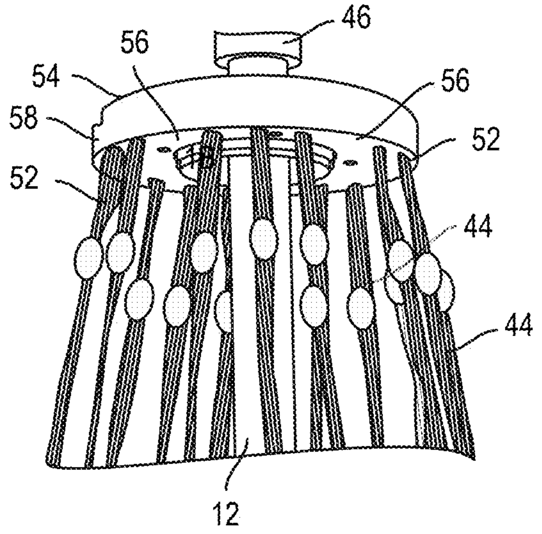
FIG. 9 is a partial enlarged view of the light string receiver mounted about the top of the mast.
Figure 10:
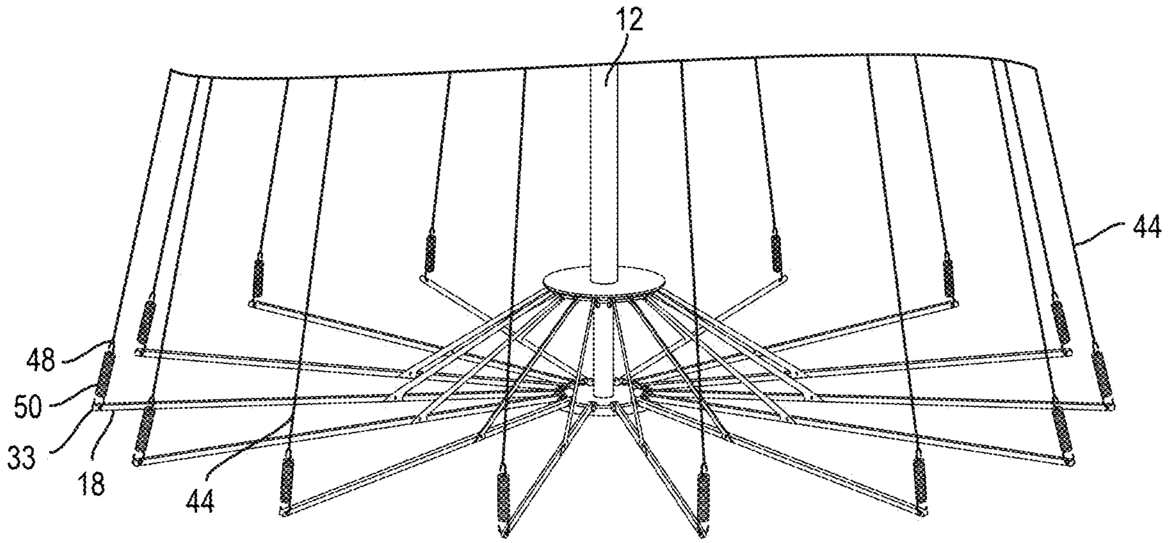
FIG. 10 is a partial enlarged view of the base of tree stand fully opened and illustrating the light string mounting to the legs of the base.

Stringers 44 extend between the eyelets 33 and the top 46 of the mast 12. Referring to FIGS. 9 and 10, in a current embodiment, the stringers 44 are string lights, such as flexible LED string lights. One end 48 of the string lights 44 are mounted to the legs 18, at the openings or eyelets 33 by, for example a biasing member such as the illustrated coil spring 50. The other end 52 of the string lights 44 are mounted to a receiver 54 at about the top 46 of the mast 12. The receiver 54 provides for support, securement and return bending of the string lights 44. In a current embodiment, the receiver 54 has a donut-like shape with the string lights inserting into the receiver through openings 56 spaced about the periphery 58 of the receiver. A power supply and conductor (not shown) and controller (not shown) are also provided to provide power and control of the string lights. The power supply, electrical connections and controller will be recognized by those skilled in the art. Alternately or in combination with the string light stringers 44, other flexible elements that fold can be used and can be made to resemble, for example, a pine (Christmas) tree limb having artificial needles, pine cones and the like.

In use, in the closed state, the legs 18 are folded toward the mast 12 and the struts 20 are pivoted inwardly so as to collapse toward the legs 18. The mast 12 is in the collapsed state. The bottom ends 48 of the string lights 44 are separated/removed from the coil springs 50 and/or the coil springs 50 are removed from the eyelets 33 so that the string lights 44 are rolled or folded for storage, but remain connected to the trees stand 10 by the receiver 54.

Referring to FIGS. 3-8, the stand is shown in the process of being opened. As the sleeve 24 is slid or urged toward the base plate 14, the struts 20 and legs 18 pivot outwardly. As the legs 18 are in the final, open state (again, referring to FIGS. 2 and 7) the biased button 40 on the mast 12 locks into the opening 42 in the sleeve 24 to lock the legs 18 in the open state. In this state, the leg free 32 ends define a plane with the mast 12 perpendicular to the plane. The mast 12 is then deployed or extended to its full height. Once the mast 12 is deployed the stringers can be unfold or uncoiled and mounted to the legs 18 at the eyelets 33 by the coils springs 50. In this way, the string lights remain in tension to provide a clean and aesthetically pleasing appearance.

The illustrated tree stand 10 is shown with sixteen legs 18 and 16 corresponding struts 20. It will be appreciated that a greater number of legs increases the stability of the stand. It will, however, also be appreciated that the stand will function with three legs, in that the three free ends of the legs will define a plane such the mast can extend perpendicular to the plane for proper support of the tree. Of course, the stand can have any number of legs greater than three, so long as the free ends of the legs define a mast-perpendicular plane when the stand is in the open state.

Figure 11:
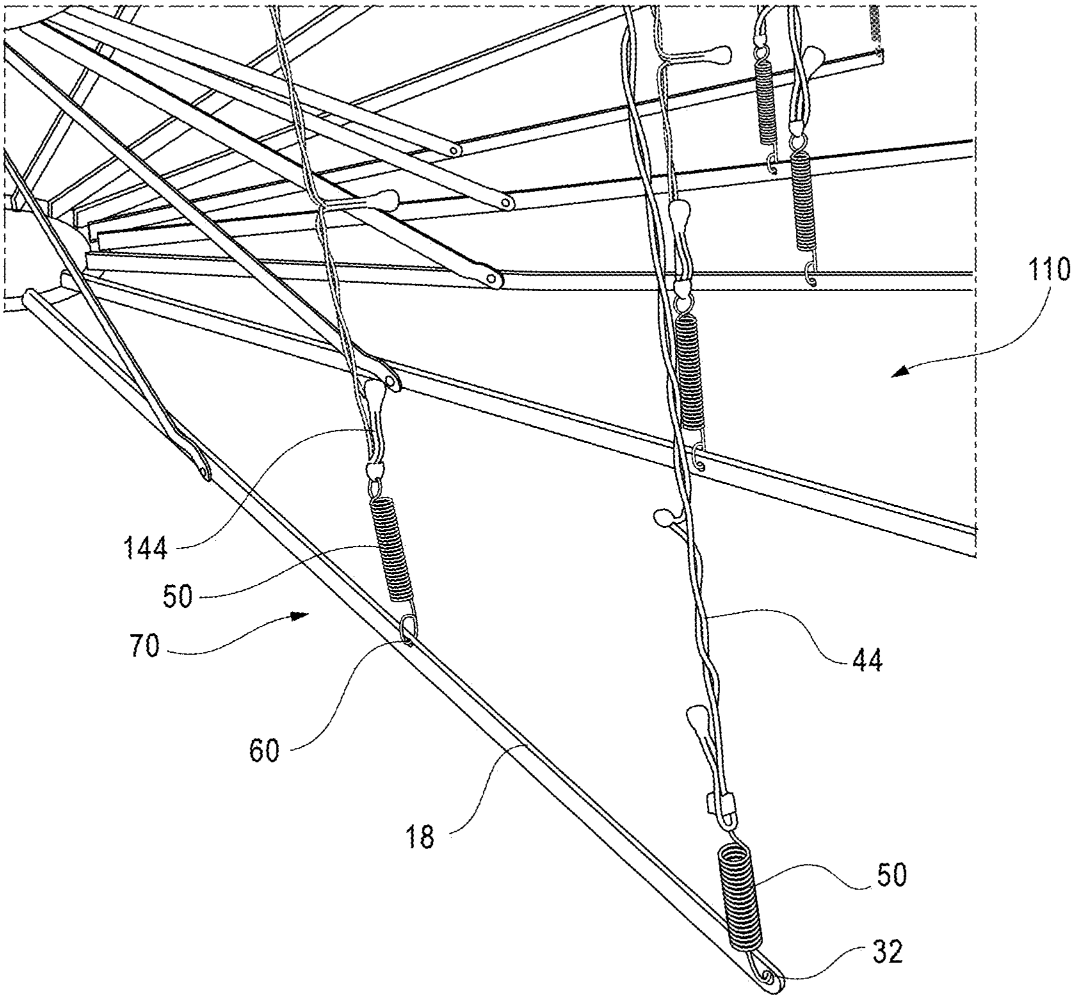
FIG. 11 is a partial enlarged view of the base of another tree stand fully opened and illustrating the light string mounting to the legs of the base.

FIG. 11 is a partial enlarged view of the base of another tree stand 110 fully opened and illustrating the light string 44, 144 mounting to the legs 18 of the base 14. This tree stand 110 includes multiple light strings 44, 144 connected to each leg, and as illustrated two light strings 44, 144 connected to each leg 18. As with the tree stand 10 of FIG. 10, one end 48, 148 of the string lights 44, 144 are mounted to the legs 18, at the free end 32 openings or eyelets 33 by, for example a biasing member 50 such as the illustrated coil spring.

In such a multi-stringer configuration 44, 144, openings 60 are formed in the legs 18 spaced from the legs' free ends 32 to accommodate the "second" light stringer 144. The other end of the string lights 144 are like light stringer 44 mounted to a receiver 54 at about the top of the mast 12. The receiver 54, as seen in FIGS. 12A and 12B, provides for support, securement and return bending of the string lights 44, 144. In a current embodiment, the receiver 54 has a donut-like shape with the string lights 44, 144 inserting into the receiver 54 through openings 56 spaced about the periphery of the receiver 54. A power supply 64 and conductor and controller 66 (see FIG. 13) are also provided to provide power and control of the string lights 44, 144. The power supply 64, electrical connections and controller 66 will be recognized by those skilled in the art. Alternately or in combination with the string light stringers 44, 144, other flexible elements that fold can be used and can be made to resemble, for example, a pine (Christmas) tree limb having artificial needles, pine cones and the like.

Figure 12:
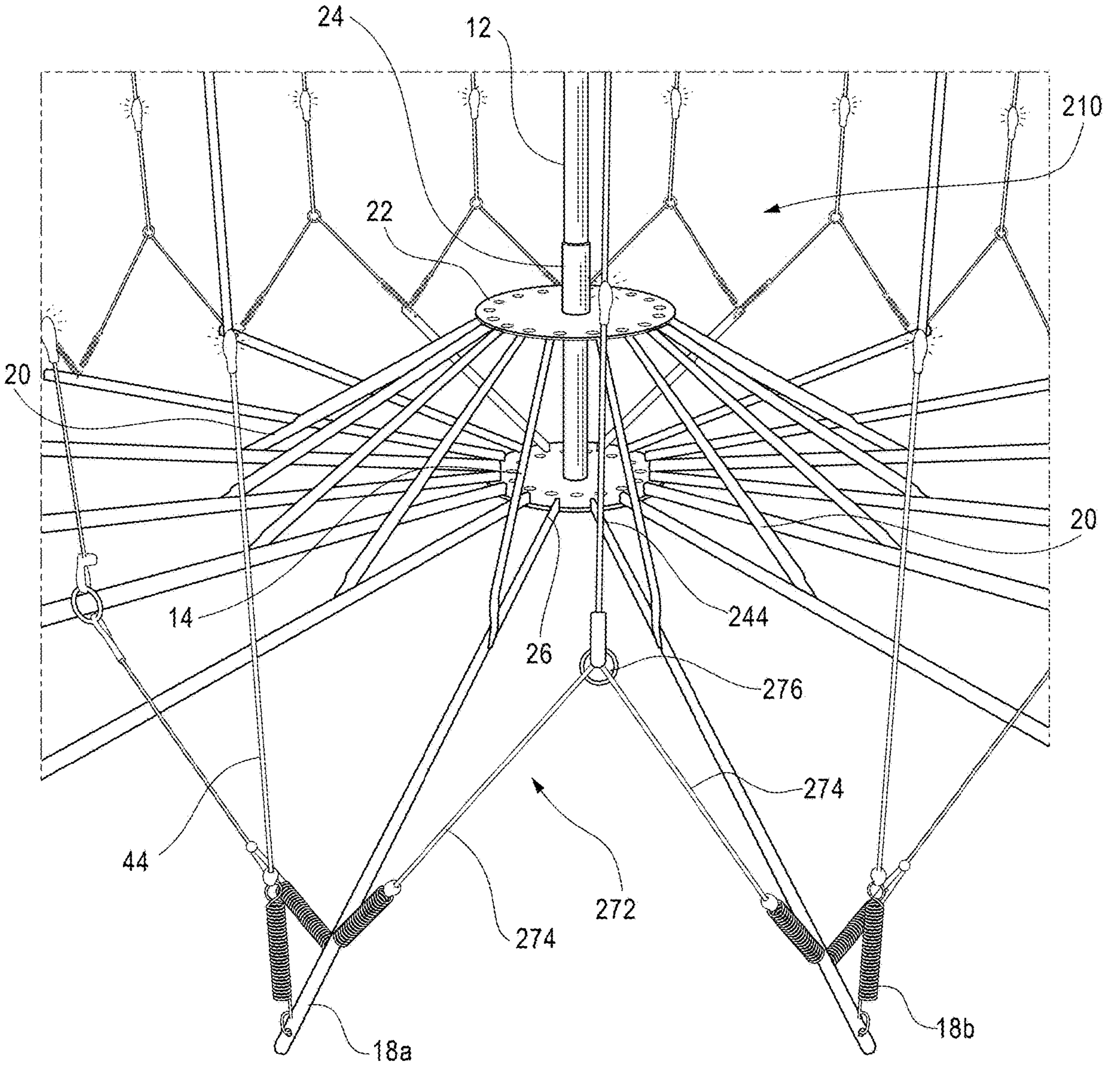
FIG. 12 is a partial view of still another tree stand fully opened and illustrating the light starting mounting to and between the legs of the base.
Figure 13:
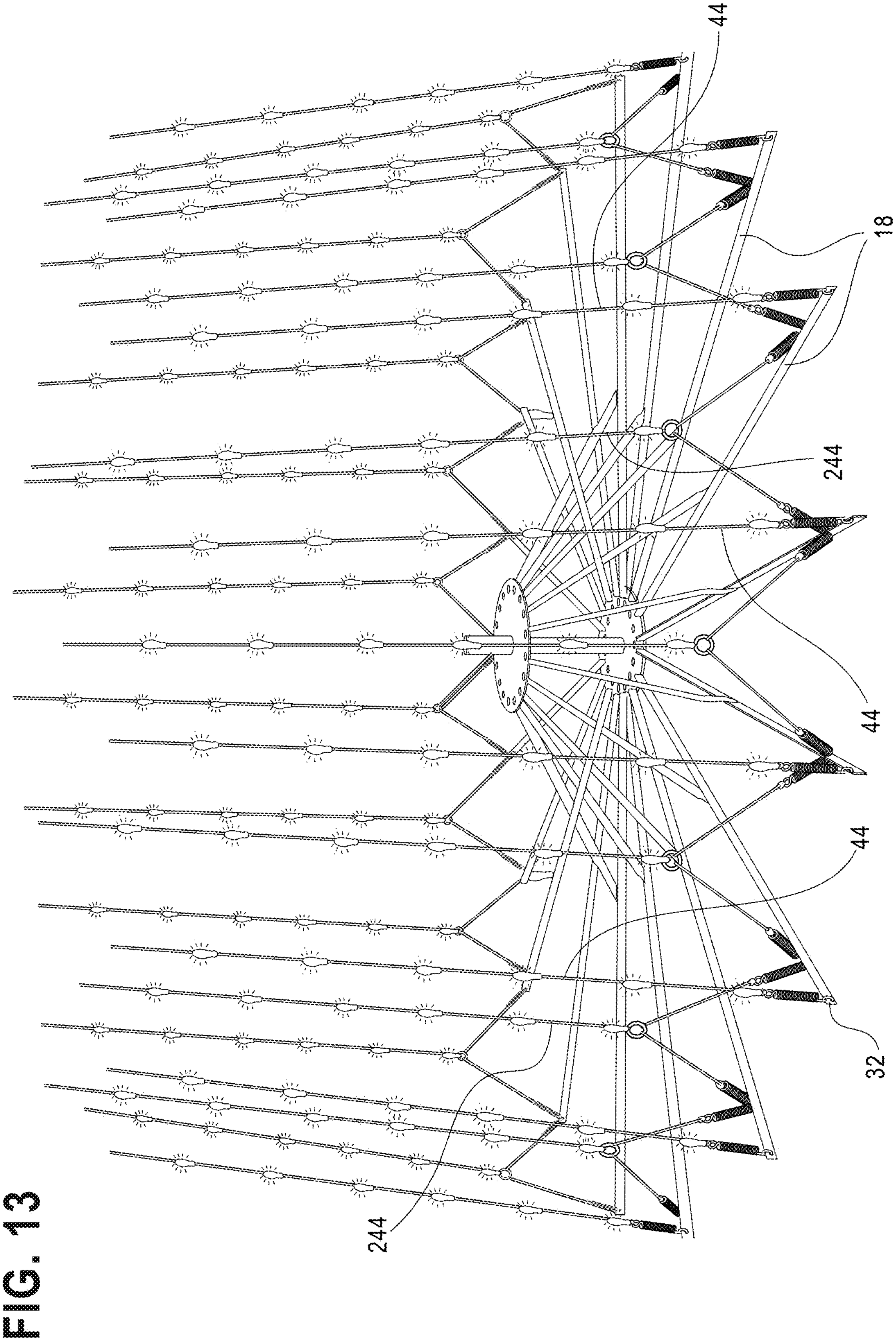
FIG. 13 is a view similar to FIG. 12 and showing the light strings illuminated.
Figure 14:
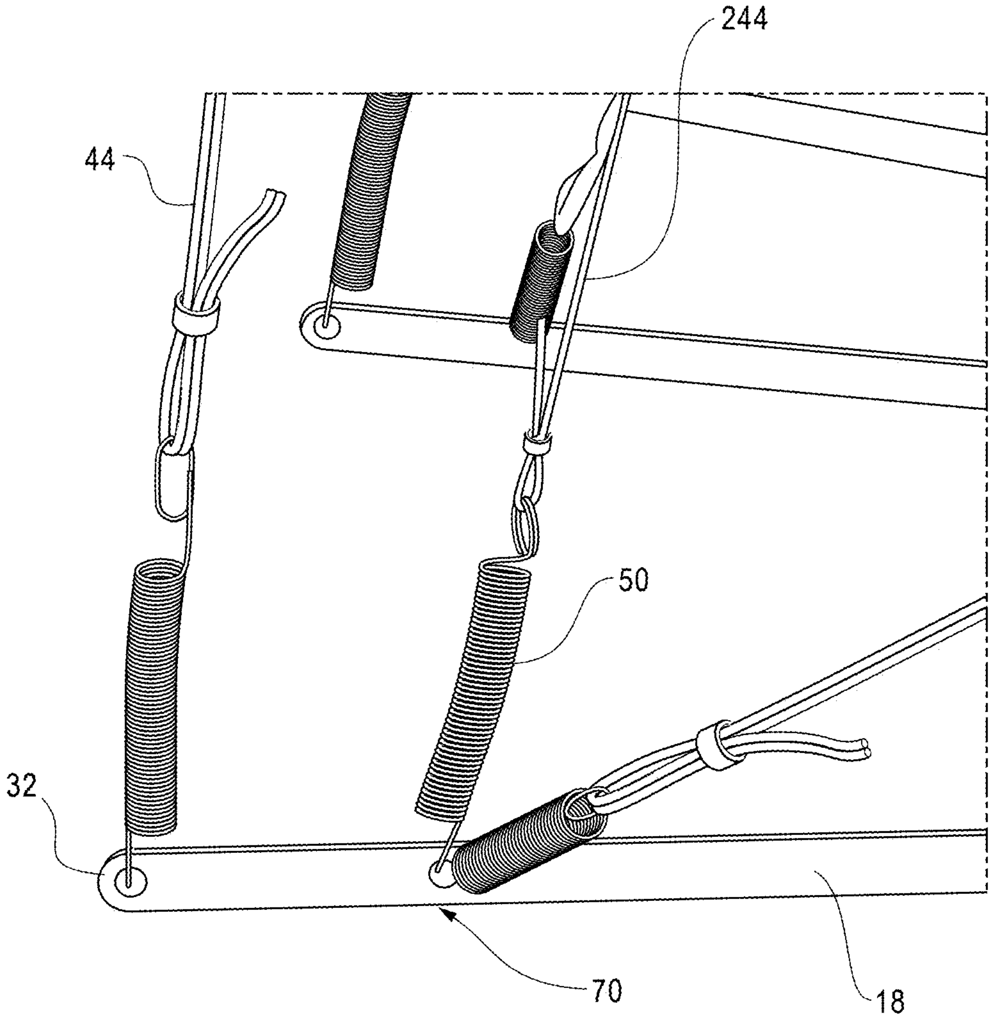
FIG. 14 is a view of the light strings mounting to and between the legs of the tree stand.
Figure 15A:
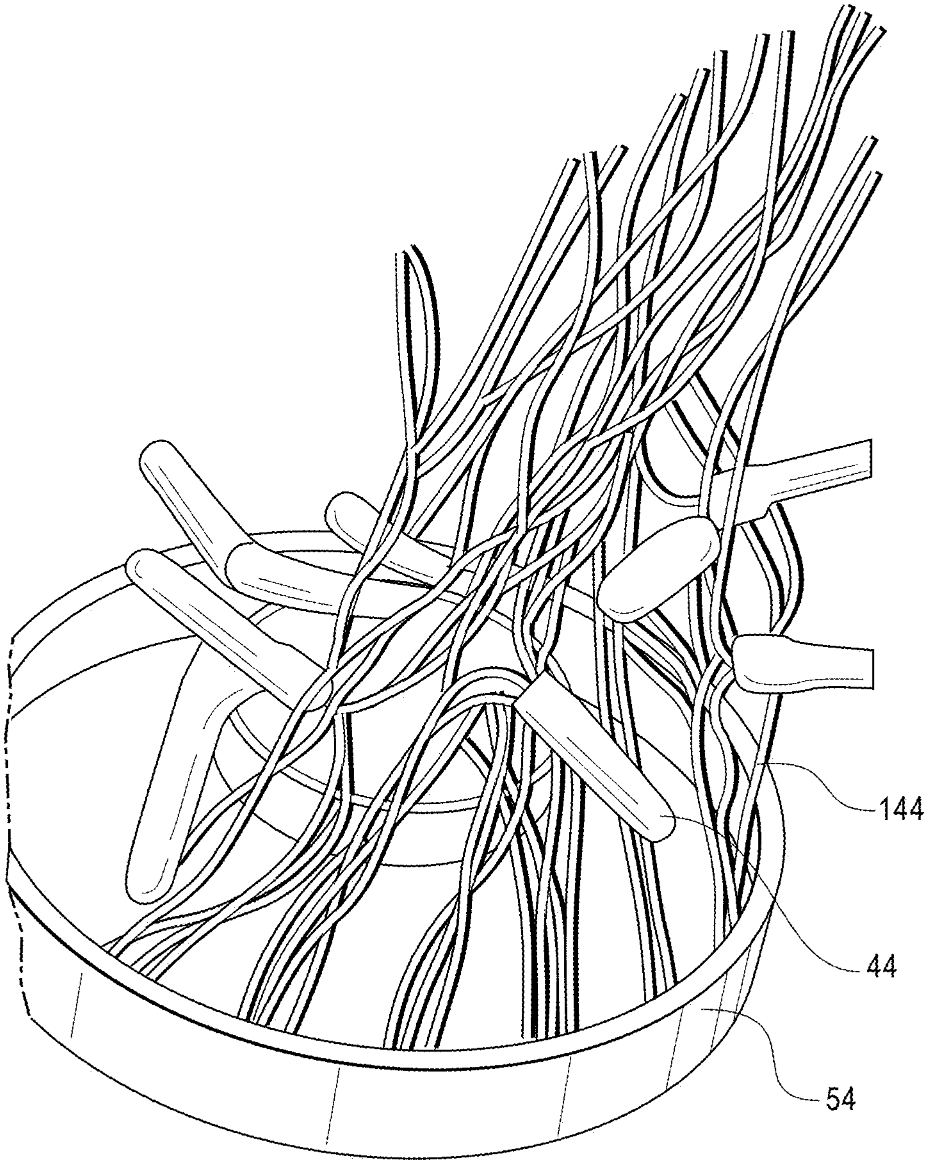
FIGS. 15A and 15B are partial enlarged views of the light string receiver mounted about the top of the mast.
Figure 15B:
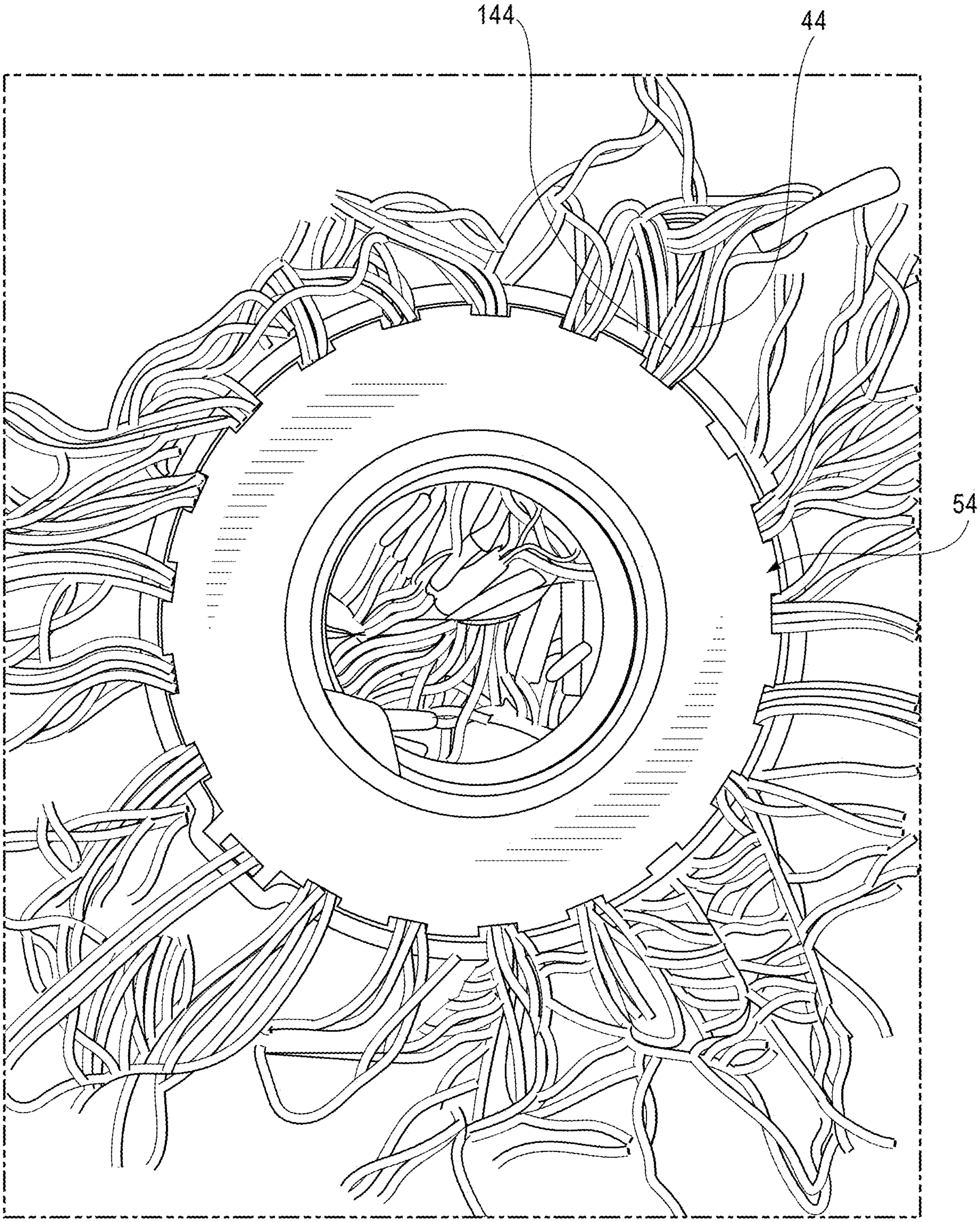
Figure 16:
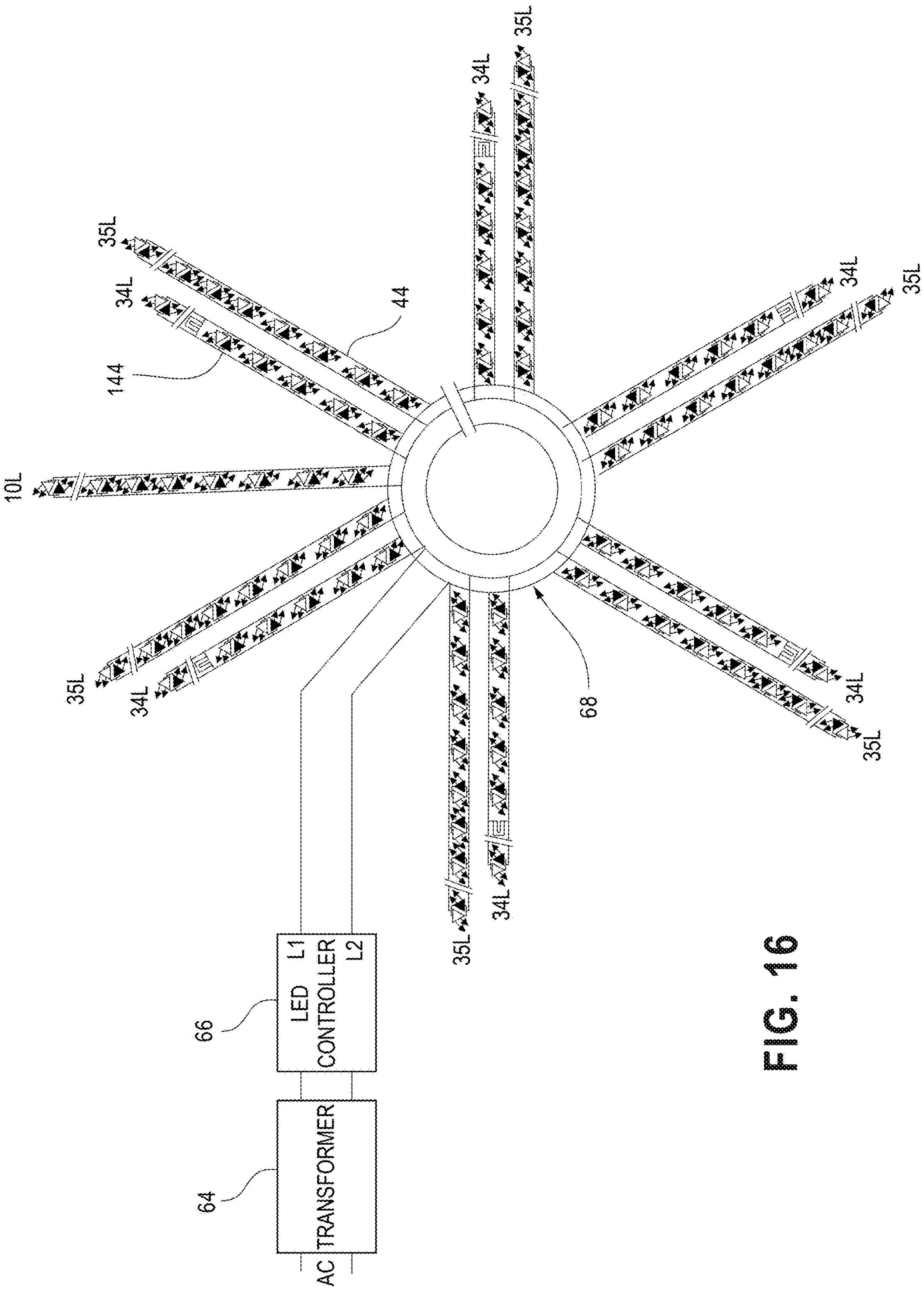
FIG. 16 is an example of a wiring diagram for the multiple string lights.

Still another embodiment of the tree stand 210 is illustrated in FIGS. 12-14. This embodiment of the tree stand 210 has the same structure as that illustrated in FIGS. 2-11, including a main pole or mast 12, a base plate 14 mounted to an end of the mast, a plurality of legs 18 pivotally mounted to the base plate 14, a plurality of struts 20, each associated with and pivotally mounted to a respective one of the legs 18, a strut plate 22 to which the struts 20 are pivotally mounted, and a sleeve 24 slidably positioned on the mast 12 and mounted to strut plate 22.

In this embodiment, additional flexible stringers 244, such as light strings, are positioned between the light strings 44 that extend from the ends 32 of the legs 18 to the receiver 54. It will be appreciated that this embodiment 210 permits the addition of additional light strings 244 without additional legs to which the light strings 244 are mounted.

In an embodiment, the additional light strings 244 extend from a location between light strings 44 and legs 18 by mountings or members 272 that that mount the additional lights strings 244 between adjacent to the legs 18*a*, 18*b*. As best seen in FIG. 12, flexible connecting members 274, such as wires or strings extend from adjacent legs 18*a*, 18*b* upwardly and toward one another to a joint or joining member 276. In the illustrated embodiment, the flexible connecting members 274 are strings that extend upwardly and toward one another and the joining member 276 is a loop. When the strings 274 are of equal length, the joint or loop 276 is positioned about midway between the legs 18*a*, 18*b* from which the strings 274 extend. As illustrated, the mount 272 has the shape of an inverted V.

In an embodiment, the additional light strings 244 are mounted to and extend from the joint or loop 276 to the receiver. It will be appreciated that there are other ways in which the light stings 244 are mounted between the legs 18*a*, 18*b*, which other ways to mount the lights strings 244 are with the scope and spirit of the present disclosure.

As seen in FIGS. 12 and 13, the additional light strings 244 can be positioned between each of the legs 18*a*, 18*b* to substantially double the number of light strings 44, 244 (it will be understood that when positioned between each of the legs 18 and light strings 44, the total number of light strings 44, 244 is doubled; it will also be understood that the additional light strings 244 need not be positioned between each light string 44 and adjacent legs 18). This arrangement positions the additional light strings 244 between light strings 44 to provide an appearance of being fuller and having a greater depth to the cone tree 10 due to the addition and placement of the additional light strings 244.

The flexible connecting members 274 can be mounted to the legs 18 in variety of ways. For example, the flexible connecting members 274 can be mounted to the legs 18 by biasing elements such springs 50, such as the illustrated coil springs. The springs 50 can be mounted to the legs 18 at the legs' free ends 32 similar to lights strings 44, or, as best seen in FIG. 14, they can be mounted to the legs 18 between the free ends 32 and the pivot ends 26 (e.g., at about 70) to provide an appearance of depth of the light strings 44, 244.

FIG. 13 is one example of a wiring diagram for the light strings. The power supply 64 receives power, anticipated to be household power (110V-240V A/C power) and an AC/DC and or DC/DC converter (e.g., a transformer or driver not shown or incorporated into either the transformer/driver 64 or controller 66) converts that power to a current useable with LED lights, such as DC power. The controller 66, such as an LED controller receives power from the transformer or converter to control power to the light strings 44, 144. The controller 66 can control the timing, sequences, color and the like of the light strings 44, 144, 244.

As illustrated, there are thirteen (13) light strings 44, 144, 244, but any number of light strings can be used. The LEDs on each light string 44, 144, 244 are wired in parallel and the lights strings 44, 144, 244 are wired in parallel to the main string supply 68. In this manner, any single LED on a light string 44, 144, 244 can fail without impact on the remainder of the LEDs in that string 44, 144, 244 and any one of the light strings can fail without impact to the other light strings.

The light stings and additional light strings can have single color LEDs (e.g., red LEDs or blue LEDs or green LEDs) or they can have RGB or RGBW(W) LEDs to provide a wide variety of lighting colors and effects.

In the illustrated embodiments, the collapsible cone tree 10, 110, 210 has a mast 12 having a top and a base 14 and a plurality of legs 18 mounted to the base 14. The legs 18 are foldable upwardly toward the mast 12 to a storage position and pivotable to unfolded state. The legs 18 can lock in the unfolded state. The legs 18 each have a free end 32.

The plurality of flexible stringers 44, 144, 244 extend between the legs' free ends 32 and the top of the mast 12, or between the legs 18 and the top of the mast 12. The plurality of stringers 44, 144, 244 include at least one stringer 44 between the free end 32 of each leg 18 and further include at least a second stringer 144 extending from at least one leg 18 at a location (at about 70) spaced from the leg's free end 32 to the top of the mast 12, and or an additional stringer 244 extending from between adjacent legs 18*a*, 18*b* and the top of the mast 12.

In some embodiments, multiple second stringers 144 extend from respective ones of the legs 18 at a location 70 spaced from the legs' free ends 32 to the top of the mast 12. In some embodiments, each of the legs 18 has a "second" stringer 144 that extends from a respective leg 18 at a location 70 spaced from that leg's 18 free end 32 to the top of the mast 12. In still other embodiments, additional stringers 244 extend from between the legs 18 and light s strings 44 by connecting members 274 to the receiver 54.

The lights strings 44, 144, 244 can be LED light strings. The LED light strings 44, 144, 244 can be attached to the legs 18 by biasing elements 50. The legs 18 can include eyelets 33 for both the first, second and additional light strings 44, 144, 244 such that the stringers 44, 144, 244 are mounted to the eyelets 33 by biasing elements 50.

In embodiments, the flexible stringers 44, 144, 244 are mounted to the top of the mast 12 at a receiver 54. The receiver 54 can have a donut shape and can be configured to fit over the top of the mast 12. In embodiments, in the unfolded state, the free ends 32 of the legs 18 define a plane, and the mast 12 is perpendicular to the plane.

An advantageous feature of the stand (in addition to its small size when in the closed or collapsed state) is that when it is in the open state, the legs have a wide stance or broad base for balance and stability, and a low profile relative to the floor. The low profile permits readily covering and/or decorating the base such that it is an integral, yet inconspicuous part of the overall holiday environment.

It is understood that the features from any of the embodiments described herein may be combined with, or replace features of other embodiments described herein, without deviating from the scope of this disclosure.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A collapsible cone tree, comprising:

a mast having a top and a base;

a plurality of legs mounted to the base, the legs foldable upwardly toward the mast to a storage position and pivotable to unfolded state, the legs lockable in the unfolded state, the legs each having a free end;

a plurality of first flexible stringers extending between the legs' free ends and the top of the mast;

a plurality of additional flexible stringers extending from between respective ones of adjacent legs to the top of the mast; and a plurality of mounts, each mount extending from adjacent ones of the legs and including a joining member, wherein the additional flexible stringers extend from respective ones of the joining members to the top of the mast, wherein each mount further includes a first flexible connecting member extending from one of the legs and a second flexible connecting member extending from an adjacent one of the legs, the first and second flexible connecting members joined to the joining member, and wherein the first and second flexible connecting members are mounted to their respective legs spaced from the legs' free ends.

2. The cone tree of claim 1 wherein the first flexible stringers and the additional flexible stringers are LED light strings.

3. The cone tree of claim 1, wherein the first flexible stringers and the mount are attached to the legs by biasing elements.

4. The collapsible cone tree of claim 1, wherein the first flexible stringers are mounted to the legs by biasing elements and wherein the mounts are mounted to the legs by biasing elements.

5. The collapsible cone tree of claim 4, wherein the biasing elements are springs.

* * * * *